United States Patent
Gu et al.

(10) Patent No.: US 11,495,962 B2
(45) Date of Patent: Nov. 8, 2022

(54) ELECTRONIC DEVICE WIRELESSLY RECEIVING POWER AND METHOD OF OPERATING SAME

(71) Applicant: Samsung Electronics Co., Ltd., Gyeonggi-do (KR)

(72) Inventors: Beomwoo Gu, Gyeonggi-do (KR); Jeongman Lee, Gyeonggi-do (KR); Seogyong Jeong, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 105 days.

(21) Appl. No.: 16/803,336

(22) Filed: Feb. 27, 2020

(65) Prior Publication Data
US 2020/0343720 A1 Oct. 29, 2020

(30) Foreign Application Priority Data
Apr. 23, 2019 (KR) .......................... 10-2019-0047399

(51) Int. Cl.
*H02J 50/12* (2016.01)
*H02J 7/00* (2006.01)
(Continued)

(52) U.S. Cl.
CPC .......... *H02H 9/04* (2013.01); *H02J 7/00308* (2020.01); *H02J 7/02* (2013.01); *H02J 50/12* (2016.02); *H02J 50/80* (2016.02)

(58) Field of Classification Search
CPC .......... H02H 9/04; H02J 7/00308; H02J 7/02; H02J 50/12; H02J 50/80; H01F 38/14
See application file for complete search history.

(56) References Cited

U.S. PATENT DOCUMENTS

2010/0084918 A1* 4/2010 Fells ................... H02J 7/00045
307/32
2012/0293008 A1* 11/2012 Park ....................... H02J 50/40
307/104

(Continued)

FOREIGN PATENT DOCUMENTS

| JP | 2012-504931 | | 2/2012 |
|---|---|---|---|
| JP | 2012504931 A | * | 2/2012 |

(Continued)

OTHER PUBLICATIONS

International Search Report dated Nov. 19, 2020 issued in counterpart application No. PCT/KR2020/005200, 11 pages.

(Continued)

*Primary Examiner* — Jared Fureman
*Assistant Examiner* — Michael J Warmflash
(74) *Attorney, Agent, or Firm* — The Farrell Law Firm, P.C.

(57) ABSTRACT

An electronic device includes a reception coil configured to wirelessly receive power based on an externally formed magnetic field, a rectifier configured to rectify power generated from the reception coil, an over-voltage protection circuit connected with the rectifier, and an output capacitor connected with the over-voltage protection circuit, wherein the over-voltage protection circuit includes a negative temperature coefficient thermistor (NTC) selectively connected in parallel with the rectifier and the output capacitor and a switch connecting the NTC to the rectifier and the output capacitor when a voltage at an output terminal of the rectifier exceeds a designated threshold, and disconnecting the NTC from the rectifier and the output capacitor when the voltage at the output terminal of the rectifier is less than or equal to the designated threshold.

16 Claims, 16 Drawing Sheets

(51) Int. Cl.
*H02J 50/80* (2016.01)
*H02H 9/04* (2006.01)
*H02J 7/02* (2016.01)

(56) References Cited

U.S. PATENT DOCUMENTS

| | | |
|---|---|---|
| 2013/0234532 A1 | 9/2013 | Fells et al. |
| 2014/0042820 A1* | 2/2014 | Park ................ B60L 53/126 |
| | | 307/104 |
| 2014/0327390 A1 | 11/2014 | Park et al. |
| 2015/0123679 A1 | 5/2015 | Kuyvenhoven et al. |
| 2015/0318713 A1* | 11/2015 | Kim .................... H02J 50/80 |
| | | 307/104 |
| 2016/0336816 A1 | 11/2016 | Mach et al. |
| 2017/0063161 A1* | 3/2017 | Sugiyama ........... B60L 53/122 |
| 2018/0262043 A1 | 9/2018 | Yi et al. |

FOREIGN PATENT DOCUMENTS

| | | | |
|---|---|---|---|
| KR | 1020120128545 | 11/2012 | |
| KR | 1020140021102 | 2/2014 | |
| KR | 10-1946027 | 2/2019 | |
| WO | WO-2019225794 A1 * | 11/2019 | ........... B60L 3/0092 |

OTHER PUBLICATIONS

Korean Office Action dated Sep. 21, 2020 issued in counterpart application No. 10-2019-0047399, 12 pages.

\* cited by examiner

ELECTRONIC DEVICE WIRELESSLY RECEIVING POWER AND METHOD OF OPERATING SAME

CROSS-REFERENCE TO RELATED APPLICATION(S)

This application is based on and claims priority under 35 U.S.C. § 119 to Korean Patent Application No. 10-2019-0047399, filed on Apr. 23, 2019, in the Korean Intellectual Property Office, the disclosure of which is incorporated by reference herein in its entirety.

BACKGROUND

1. Field

The present disclosure generally relates to electronic devices wirelessly receiving power and methods for operating the same.

2. Description of Related Art

Portable digital communication devices have become must-have items for modern people. Customers desire to receive various high-quality services anytime and anywhere. Internet of things (IoT) technology bundles various sensors, home appliances, and communication devices into a single network. A diversity of sensors requires a wireless power transmission system for seamless operations.

Wireless power transmission may be performed in a magnetic induction, magnetic resonance, and electromagnetic wave scheme. The magnetic induction or magnetic resonance scheme is advantageous in charging electronic devices positioned within a relatively short distance from the wireless power transmitter. The electromagnetic wave scheme is more advantageous for remote power transmission that reaches a few meters, as compared with the magnetic induction or magnetic resonance scheme. The electromagnetic wave scheme is primarily intended for remote power transmission, and the specific locations of remote power receivers may be known in order to deliver power in an efficient way.

Small Bluetooth headsets, wearable devices, smartphones, robots, vacuums, or other large-scale electronic devices may be implemented to wirelessly receive power. System stability during wireless power transmission/reception may be a critical issue. In wireless power transmission/reception, an increased misalignment between the wireless power transmitter and an electronic device, functioning as the wireless power receiver, may cause a large variation in a system operation point (e.g., frequency, coupling coefficient, or load), resulting in an erroneous outcome.

For example, if the reception coil of the electronic device is repositioned closer to the transmission coil of the wireless power transmitter after charging begins, the voltage at the reception coil (or the output terminal of the rectifier connected with the reception coil) may surge. Alternatively, if the operation of the battery management system (BMS) shuts off due to a malfunction of the battery, the load reduces and, thus, the voltage at the reception coil (or the output terminal of the rectifier connected with the reception coil) may rise drastically.

In order to protect the components of the electronic device in such a context, the wireless power receiving electronic device may need a protection circuit. Conventional protection circuits which are intended for wired charging may prevent a voltage spike that arises when plugged in or out of a power outlet, when there are errors due to use of an inadequate power outlet, or when there is a sharp variation in load when the load is removed.

However, wireless charging systems may often encounter abnormal contexts due to a misalignment between the power transmitter and receiver, distance, operation frequency, and load variations. Furthermore, although the power receiver may detect an erroneous circumstance, thereby starting the operation of the protection circuit, if the wireless power transmitter keeps on sending power, the erroneous circumstance may persist for a few hundreds of milliseconds to a few seconds. The wireless charging system may run into current or voltage abnormalities depending on its operation point (e.g., frequency, coupling coefficient, or load), causing the protection circuit to be broken or damaged, thereby failing to respond to such an abnormality.

SUMMARY

The present disclosure has been made to address the above-mentioned problems and disadvantages, and to provide at least the advantages described below.

In accordance with an aspect of the disclosure, an electronic device includes a reception coil configured to wirelessly receive power based on an externally formed magnetic field, a rectifier configured to rectify power generated from the reception coil, an over-voltage protection circuit connected with the rectifier, and an output capacitor connected with the over-voltage protection circuit, wherein the over-voltage protection circuit includes a negative temperature coefficient thermistor (NTC) selectively connected in parallel with the rectifier and the output capacitor and a switch connecting the NTC to the rectifier and the output capacitor when a voltage at an output terminal of the rectifier exceeds a designated threshold and disconnecting the NTC from the rectifier and the output capacitor when the voltage at the output terminal of the rectifier is less than or equal to the designated threshold.

In accordance with another aspect of the disclosure, an electronic device includes a reception coil configured to wirelessly receive power based on an externally formed magnetic field, a rectifier configured to rectify power generated from the reception coil, an over-voltage protection circuit connected with the rectifier, an output capacitor connected with the over-voltage protection circuit and a processor, wherein the over-voltage protection circuit includes a variable resistor selectively connected in parallel with the rectifier and the output capacitor and a switch connecting the variable resistor to the rectifier and the output capacitor when a voltage at an output terminal of the rectifier exceeds a designated threshold and disconnecting the variable resistor from the rectifier and the output capacitor when the voltage at the output terminal of the rectifier is less than or equal to the designated threshold, and wherein the processor is configured to adjust a resistance of the variable resistor based on the voltage at the output terminal of the rectifier.

In accordance with another aspect of the disclosure, a wireless power transmitter includes a power source, an inverter configured to convert power from the power source into alternating current (AC) power and output the AC power, a transmission coil configured to generate a magnetic field using the converted power output from the inverter, a communication circuit configured to perform communication with an electronic device configured to wirelessly receive power from the wireless power transmitter, and a processor configured to control the inverter to stop operating based on a current input to the transmission coil exceeding a designated threshold current and to control the inverter to stop operating based on receiving a communication signal indicating an occurrence of an over voltage in the electronic device via the communication circuit.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

In accordance with various embodiments, in an electronic device wirelessly receiving power, a variable resistor may be connected to the path of a switch for discharging when an abnormality occurs. Additionally, an electronic device and method of operating a protection circuit may be provided to allow a relatively low current to be discharged via the switch when an abnormality occurs.

Figure 1:
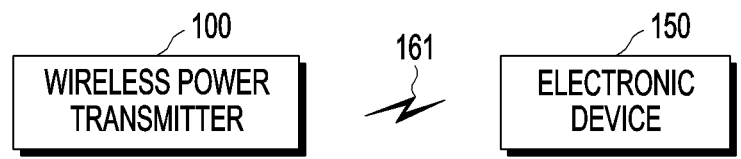
FIG. 1 is a block diagram illustrating a wireless power transmitter and an electronic device, according to an embodiment.

FIG. 1 is a block diagram illustrating a wireless power transmitter and an electronic device, according to an embodiment.

Referring to FIG. 1, a wireless power transmitter 100 may wirelessly transmit power 161 to an electronic device 150. The wireless power transmitter 100 may transmit the power 161 to the electronic device 150 according to various charging schemes.

The wireless power transmitter 100 may transmit power 161 according to an induction scheme. Using the induction scheme, the wireless power transmitter 100 may include a power source, a direct current (DC)-AC converting circuit, an amplifying circuit, an impedance matching circuit, at least one capacitor, at least one coil, and a communication modulation/demodulation circuit. The at least one capacitor together with the at least one coil may constitute a resonance circuit. The wireless power transmitter 100 may be implemented in a scheme defined in the wireless power consortium (WPC or Qi) standards. An electronic device 150 wirelessly receiving power may include a reception coil, at least one capacitor, an impedance matching circuit, a rectifier, a DC-DC converter, a charger, a battery, and a communication modulation/demodulation circuit.

The wireless power transmitter 100 may transmit power 161 according to a resonance scheme. Using the resonance scheme, the wireless power transmitter 100 may include a power source, a DC-AC converting circuit, an amplifying circuit, an impedance matching circuit, at least one capacitor, at least one coil, and an out-band communication circuit (e.g., a Bluetooth low energy (BLE) communication circuit). The at least one capacitor and the at least one coil may constitute a resonance circuit. The wireless power transmitter 100 may be implemented in a scheme defined in the Alliance for Wireless Power (A4WP) standards (or Air Fuel Alliance (AFA) standards). The wireless power transmitter 100 may include a coil that is capable of producing a magnetic field when letting an electric current flow thereacross by a resonance or induction scheme. The process of the wireless power transmitter 100 producing an induced magnetic field may be represented as the wireless power transmitter 100 wirelessly transmitting the power 161. Further, the electronic device 150 may include a coil that produces an induced electromotive force by the generated magnetic field varying in magnitude over time. The process of producing an induced electromotive force through the coil may be represented as the electronic device 150 wirelessly receiving the power 161. The electronic device 150 may include a reception coil, at least one capacitor, an impedance matching circuit, a rectifier, a DC-DC converter, a charger, a battery, and an out-band communication circuit.

The wireless power transmitter 100 may transmit power 161 using a radio frequency (RF). Using a resonance scheme for the RF, the wireless power transmitter 100 may include a power source, a DC-AC converting circuit, a plurality of antennas, a plurality of amplifiers corresponding to the plurality of antennas, a plurality of phase shifters corresponding to the plurality of antennas, and an out-band communication circuit (e.g., a BLE communication circuit). The wireless power transmitter 100 may produce RF waves based on the position of the electronic device 150. For example, the wireless power transmitter 100 may produce a beamformed RF wave by controlling at least one of the phase shifters or amplifiers.

The wireless power transmitter 100 may include a coil that is capable of producing a magnetic field when letting an electric current flow thereacross by a resonance or induction scheme. The process of the wireless power transmitter 100 producing an induced magnetic field may be represented as the wireless power transmitter 100 wirelessly transmitting the power 161. The wireless power transmitter 100 may produce a beamformed RF wave by the RF scheme, and this process may be referred to as "the wireless power transmitter 100 wirelessly transmits power 161."

Further, the electronic device 150 may include a coil that produces an induced electromotive force by the generated magnetic field varying in magnitude over time. The electronic device 150 may pick up (i.e., sense) the RF wave formed around the electronic device 150. The above-described process may be represented as the phrase "the electronic device 150 wirelessly receives the power 161."

The wireless power transmitter 100 may communicate with the electronic device 150 according to an in-band scheme. The wireless power transmitter 100 or the electronic device 150 may vary the load (or impedance) on the data to be transmitted, according to an on/off keying modulation scheme. The wireless power transmitter 100 or the electronic device 150 may determine data transmitted from its opposite device by measuring a variation in load or impedance based on a variation in the current, voltage, or power across the coil. For example, the wireless power transmitter 100 may communicate with the electronic device 150 according to an out-band scheme. The wireless power transmitter 100 or the electronic device 150 may communicate data using a communication circuit (e.g., a BLE communication module) provided separately from the coil or patch antennas.

As set forth herein, the phrase "the wireless power transmitter 100 performs a particular operation" or the phrase "the electronic device 150 performs a particular operation" may mean that various hardware devices, such as a control circuit, a processor, a coil, or a patch antenna included in the wireless power transmitter 100 or the electronic device 150, performs the particular operation. The phrase "the wireless power transmitter 100 performs a particular operation" or the phrase "the electronic device 150 performs a particular operation" may also mean that the processor controls another hardware device to perform the particular operation. The phrase "the wireless power transmitter 100 performs a particular operation" or the phrase "the electronic device 150 performs a particular operation" may also mean that the processor or another hardware device triggers the particular operation as an instruction for performing the particular operation, which is stored in a storage circuit (e.g., a memory) of the wireless power transmitter 100 or the electronic device 150, and is executed.

Figure 2A:
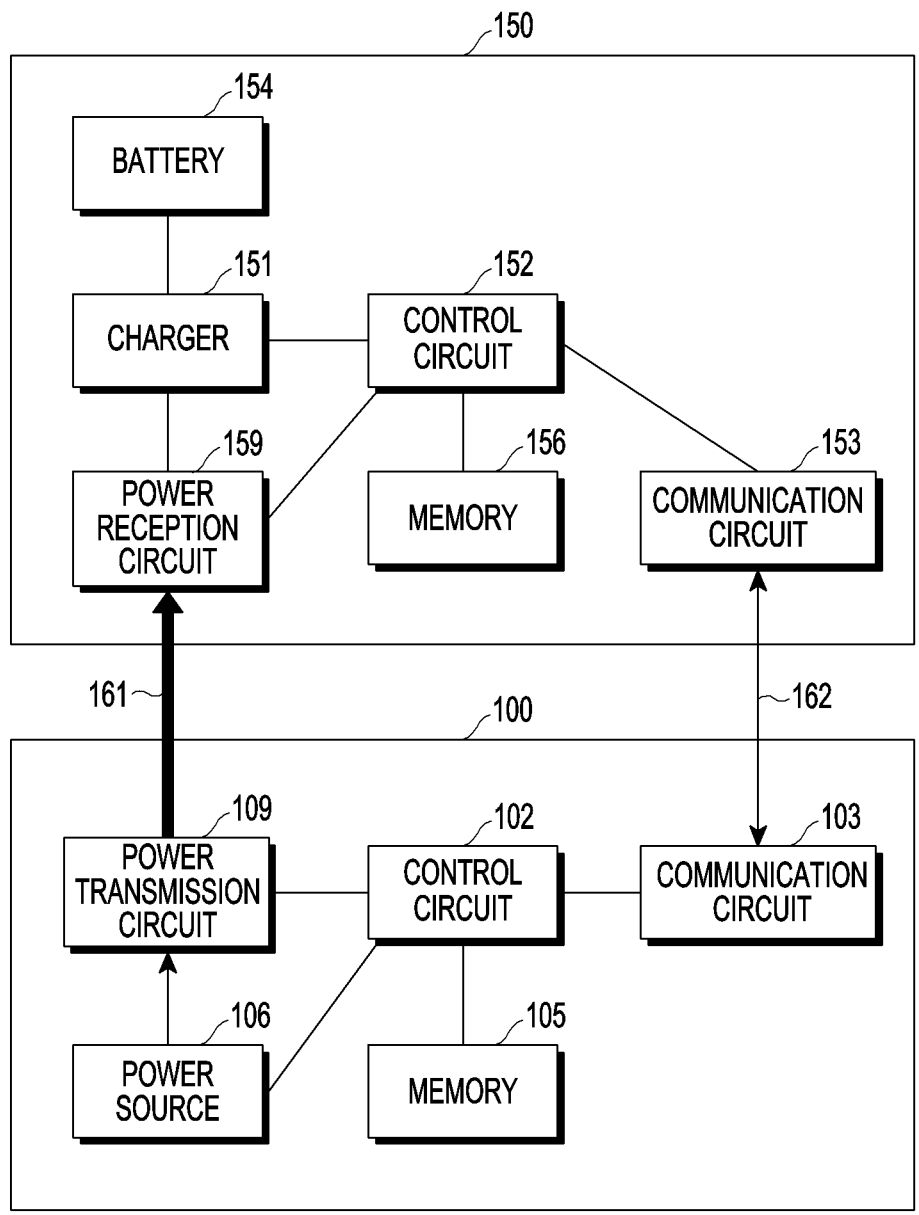
FIG. 2A is a view illustrating a wireless power transmitter and an electronic device, according to an embodiment.

FIG. 2A is a view illustrating a wireless power transmitter and an electronic device, according to an embodiment.

Referring to FIG. 2A, a wireless power transmitter 100 includes a control circuit 102, a communication circuit 103, a memory 105, a power source 106, or a power transmission circuit 109. The electronic device 150 includes a charger, a control circuit 152, a communication circuit 153, a battery 154, a memory 156, or a power reception circuit 159.

The power transmission circuit 109 may wirelessly transmit power 161 according to at least one of an induction scheme, a resonance scheme, or an electromagnetic wave scheme. The detailed configurations of the power transmission circuit 109 and the power reception circuit 159 are described below in greater detail with reference to FIGS. 2A and 2B.

The control circuit 102 may control the overall operation of the wireless power transmitter 100. For example, the control circuit 102 may determine whether to transmit the power 161, control the magnitude of the power 161, or control at least one function (e.g., starting or stopping charging) of the electronic device 150. The control circuit 102 in the wireless power transmitter 100 or the control circuit 152 in the electronic device 150 may be implemented in various circuits capable of performing calculation, such as a central processing unit (CPU) or other general-purpose processors, a mini-computer, a microprocessor, a micro controlling unit (MCU), or a field programmable gate array (FPGA). The control circuit 102 may transmit/receive data to/from the electronic device 150 via the communication circuit 103. The data may be used to control wireless power transmission/reception. The communication circuit 103 and the communication circuit 153 may be implemented as out-band communication circuits (e.g., Bluetooth communication modules or near-field communication (NFC) communication modules) or in-band communication circuits. In the in-band communication scheme, the communication circuit 153 may include a switch connected with a coil of the power reception circuit 159 directly or via another element and a dummy load (e.g., a dummy resistor or a dummy capacitor) connected through the switch to the coil directly or via another element. The communication circuit 103 may identify information based on a variation in the voltage or current applied to the coil in the power transmission circuit 109.

The power reception circuit 159 may wirelessly receive power according to at least one of an induction scheme, a resonance scheme, or an electromagnetic wave scheme from the power transmission circuit 109. The power reception circuit 159 may perform power processing, such as rectifying the received AC power into a DC waveform, converting the voltage, or regulating the power. The charger 151 may charge the battery 154 with the received regulated power (e.g., DC power). The charger 151 may adjust at least one of the voltage or current of the received power and transfer the adjusted power to the battery 154. The battery 154 may store power and transfer the power to other hardware components. A power management integrated circuit (PMIC) may receive power from the power reception circuit 159 and transfer the power to other hardware components, or the PMIC may receive power from the battery 154 and transfer the power to other hardware components.

The processor 152 may control the overall operation of the electronic device 150. The memory 156 may store instructions to perform the overall operation of the electronic device 150 and for performing the overall operation of the wireless power transmitter 100. The memory 105 may store a lookup table of the relationship between a magnitude of power from information obtained via the communication circuit 103 and the magnitude of power to be transmitted. Also, the lookup table stored in the memory 105 may include equation information of the relationship between the magnitude of power from information and the magnitude of power to be transmitted. The memory 105 in the wireless power transmitter 100 or the memory 156 in the electronic device 150 may be implemented as various types, such as a read only memory (ROM), a random access memory (RAM), or a flash memory.

Figure 2B:
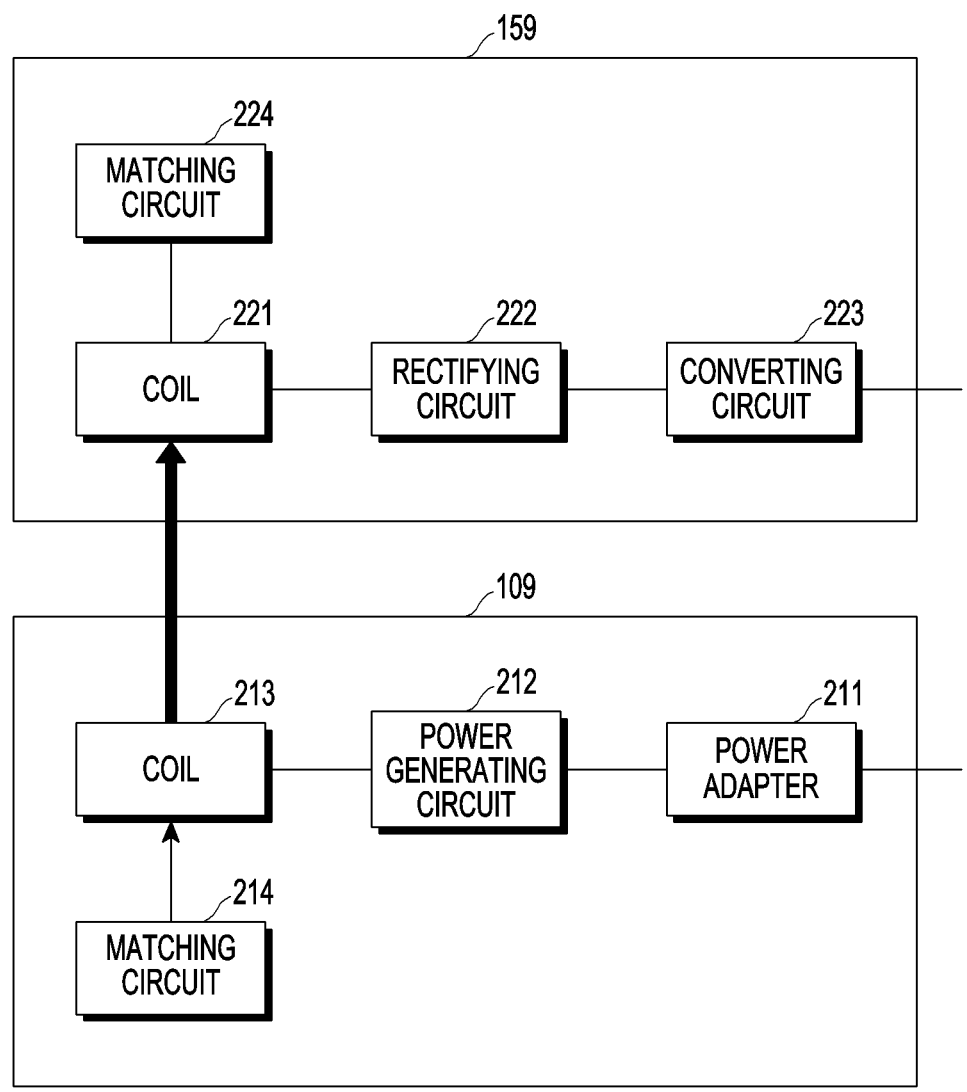
FIG. 2B is a block diagram illustrating a power transmission circuit and a power reception circuit, according to an embodiment.

FIG. 2B is a block diagram illustrating a power transmission circuit and a power reception circuit, according to an embodiment.

The power transmission circuit 109 includes a power adapter 211, a power generating circuit 212, a coil 213, and a matching circuit 214. The power adapter 211 may receive power from the power source 106 and provide the power to the power generating circuit 212. The power adapter 211 may be a power interface and the power adapter 211 may not be included in the wireless power transmitter 100. The power generating circuit 212 may convert the received power into an AC waveform and/or may amplify the received power and transfer the amplified power to the coil 213. The frequency of the AC waveform may be set as a value from 100 kilohertz (kHz) to 205 kH or 6.78 megahertz (MHz), depending on a standard. The power generating circuit 212 may include an inverter. The inverter may be a full-bridge inverter or a half-bridge inverter. When power is applied to the coil 213, an induced magnetic field that varies in magnitude over time may be produced across the coil 213, thus allowing for wireless transmission of power. At least one capacitor that, along with the coil 213, constitutes a resonance circuit may further be included in the power transmission circuit 109. The matching circuit 214 may impedance-match the power transmission circuit 109 with the power reception circuit 159 by varying at least one of the capacitance or reactance of the circuit connected with the coil 213 under the control of the control circuit 102. An induced electromotive force may be generated at the coil 221 of the power reception circuit 159 by the magnetic field which varies in magnitude over time, and accordingly, the power reception circuit 159 may wirelessly receive power. The rectifying circuit 222 may rectify the AC waveform of power received. A converting circuit 223 may adjust the voltage of the power rectified and transfer the result to the PMIC or charger. The power reception circuit 159 may further include a regulator. Alternatively, the converting circuit 223 may be replaced with a regulator. The matching circuit 224 may impedance-match the power transmission circuit 109 with the power reception circuit 159 by varying at least one of the capacitance or reactance of the circuit connected with the coil 221 under the control of the control circuit 152.

The power reception circuit 159 may include a protection circuit or may connect to a protection circuit. A configuration of the protection circuit is described below in detail.

Figure 3:
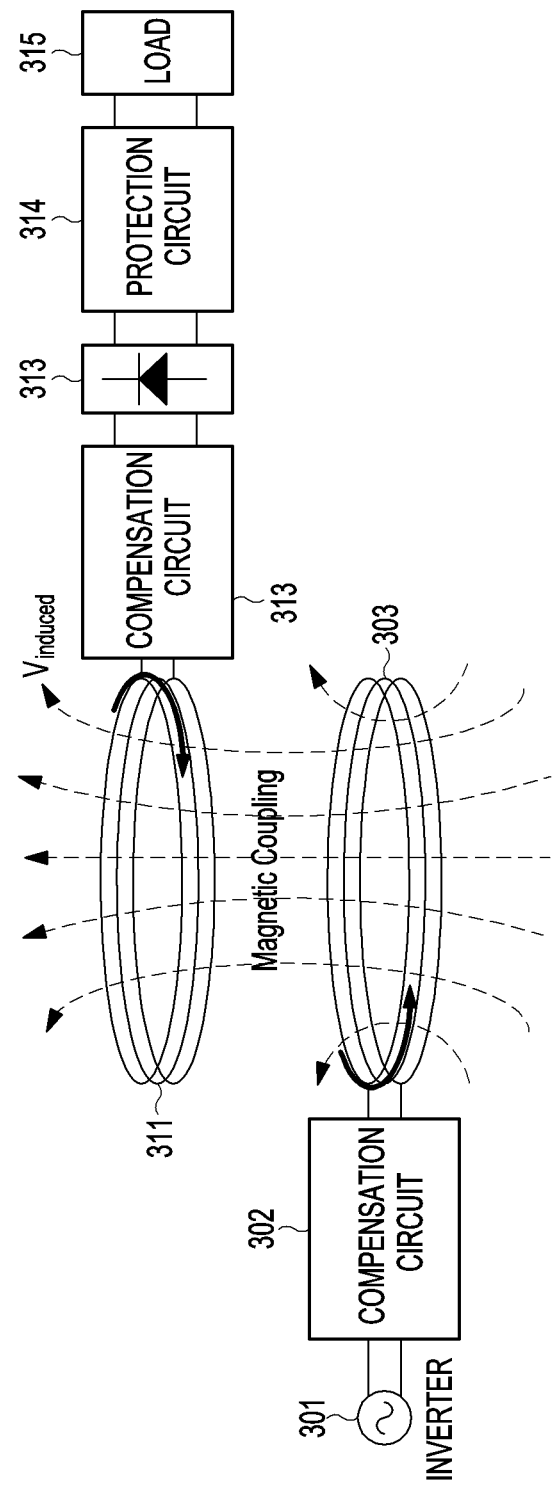
FIG. 3 is a view illustrating an electronic device including a protection circuit, according to an embodiment.

FIG. 3 is a view illustrating an electronic device including a protection circuit, according to an embodiment.

Referring to FIG. 3, a wireless power transmitter includes an inverter 301, a compensation circuit 302, and a transmission coil 303. The inverter 301 may DC-to-AC convert power received from a power source or the outside. The compensation circuit 302 may include at least one element capable of performing impedance matching and at least one switch connected with at least one element. As the at least one switch turns on or off, the compensation circuit 302 may have various impedances. The compensation circuit 302 may include at least one variable element. The compensation circuit 302 may have various impedances based on variations in the element values of the variable element. Impedance matching may be performed based on various impedances.

AC power (i.e., current or voltage) from the inverter 301 may be applied to the transmission coil 303. A magnetic field may be produced around the transmission coil 303. The reception coil 311 may form a magnetic coupling with the transmission coil 303. The reception coil 311 may produce an induced electromotive force based on the magnetic field varied over time and, thus an induced voltage (Vinduced) may be applied to the reception coil 311.

The compensation circuit 312 may include at least one element capable of performing impedance matching and at least one switch respectively connected with at least one element. As the at least one switch turns on or off, the compensation circuit 312 may have various impedances. The compensation circuit 312 may include at least one variable element. The compensation circuit 312 may have various impedances based on variations in the element values of the variable element. Impedance matching may be performed based on various impedances.

The rectifier 313 may convert AC power output from the reception coil 311 into DC power and output the DC power. The rectified power output from the rectifier 313 may be transferred to the load 315. The load 315 may include a charger for charging the battery or a PMIC, but is not limited thereto.

The protection circuit 314 may connect to the output terminal of the rectifier 313. The magnitude of power (e.g., the magnitude of current or voltage) at the output terminal of the rectifier 313 may correspond to the magnitude of power at the output terminal of the reception coil 311. When the magnitude of power at the output terminal of the rectifier 313 meets a condition corresponding to an abnormality, the protection circuit may stop power delivery from the rectifier 313 to the load 315. Unless the magnitude of power at the output terminal of the rectifier 313 meets the condition corresponding to the abnormality, the protection circuit may allow power delivery from the rectifier 313 to the load 315. The operation of the protection circuit 314 may mean a switch in the protection circuit 314 is turned on/off, or the switch is kept on/off.

Additionally, the protection circuit 314 may be connected to other components or positioned elsewhere.

Figure 4A:
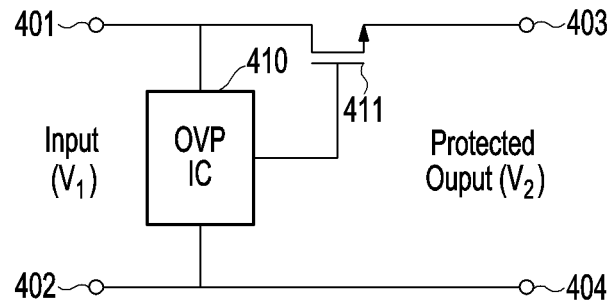
FIG. 4A is a view illustrating a configuration of a protection circuit, according to an embodiment.

FIG. 4A is a view illustrating a configuration of a protection circuit, according to an embodiment.

Referring to FIG. 4A, a protection circuit includes an over-voltage protection integrated circuit (IC) 410 and a switch 411. The protection circuit may be used for wired charging. Input terminals 401 and 402 of the protection circuit may connect to a power source using an adapter, and current may be applied from the power source to the input terminals 401 and 402.

As illustrated in FIG. 4A, the over-voltage protection IC 410 is connected with the first input terminal 401 and the second input terminal 402. The switch 411 is connected to the first input terminal 401 and the over-voltage protection IC 410. The switch 411 may selectively connect the first input terminal 401 and the first output terminal 403. The over-voltage protection IC 410 and the second output terminal 404 is connected to the second input terminal 402.

Upon identifying that the input voltage (Input (V1)) exceeds a designated threshold voltage, the over-voltage protection IC 410 may control the switch 411 to turn off (open-circuit state). Upon identifying that the input voltage is less than or equal to the designated threshold voltage, the over-voltage protection IC 410 may control the switch 411 to turn on (short-circuit state). Thus, when the input voltage is less than or equal to the designated threshold voltage, the switch is in the on state and, thus, current from the power source may be transferred to the outside (e.g., a load) via the output terminals 403 and 404. If the input voltage exceeds the designated threshold voltage, i.e., in the event of an abnormality, the switch is in the off state and, thus, current from the power source is not transferred to the output terminals 403 and 404. Thus, in various abnormalities which may arise in wired charging (e.g., a voltage spike by energy stored in the transformer when plugged in or out of the power outlet, plug-in to an inadequate power outlet, or a sharp load variation due to load removal), application of excessive current or voltage to the load may be prevented.

However, in the cases where current source-based power is applied to the input terminals 401 and 402, if the switch 411 turns off, the input voltage may surge, resulting in a high chance of permanent damage to the elements connected to the input terminals 401 and 402. Thus, a protection circuit including a short circuit may be implemented which may detour the current from the input terminals 401 and 402.

Figure 4B:
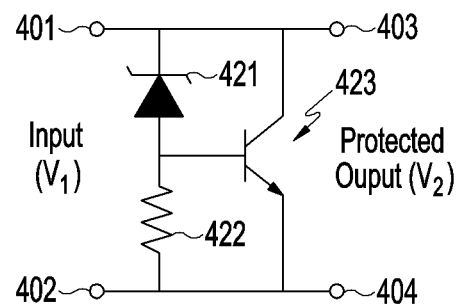
FIG. 4B is a view illustrating a configuration of a protection circuit, according to an embodiment.

FIG. 4B is a view illustrating a configuration of a protection circuit, according to an embodiment.

Referring to FIG. 4B, a Zener diode 421 and a resistor 422 are connected to the input terminals 401 and 402 while forming a first path. A switch 423 is connected to the input terminals 401 and 402 while forming a second path. The switch 423 is connected to the input terminal of the Zener diode 421. In the protection circuit of FIG. 4B, when an over voltage is applied, a detouring path from the input terminals 401 and 402 may be formed, allowing current to detour. For example, if the voltage V1 at the input terminal exceeds the threshold voltage, the switch 423 may be controlled to turn on and, as power is supplied via the detour path, a large magnitude of power may be prevented from flowing to the load connected with the output terminals 403 and 404. However, if voltage source-based power is provided, an over current may flow to the elements in the protection circuit, so that the elements may be likely to be permanently broken. Thus, the protection circuit may be used for the purpose of instantaneous protection, e.g., protection against energy stored in the inductor.

However, such a protection circuit which provides one-time instantaneous protection against abnormality may be inappropriate for electronic devices that wirelessly receive power. Wireless power transmission/reception may frequently encounter abnormalities for various reasons, such as a misalignment, a distance, an operation frequency, and load variations between the transmission coil and the reception coil. Thus, a need exists for a protection circuit capable of being used more than once (i.e., continuous use). Further, the electronic device 150 wirelessly receiving power may report an abnormality to the wireless power transmitter 100. The wireless power transmitter 100 may identify the abnormality and thus stop power transmission. However, such an operation requires a few hundreds of milliseconds to a few seconds. During the required time, power reception may continue and, thus, additional protection is required. Further, voltage source nature and current source nature may be shown depending on the operation point (frequency, coupling coefficient, or load) of the wireless power transmission/reception system. Thus, the protection circuit according to the comparative example may be insufficient to protect electronic devices wirelessly receiving power.

Figure 5A:
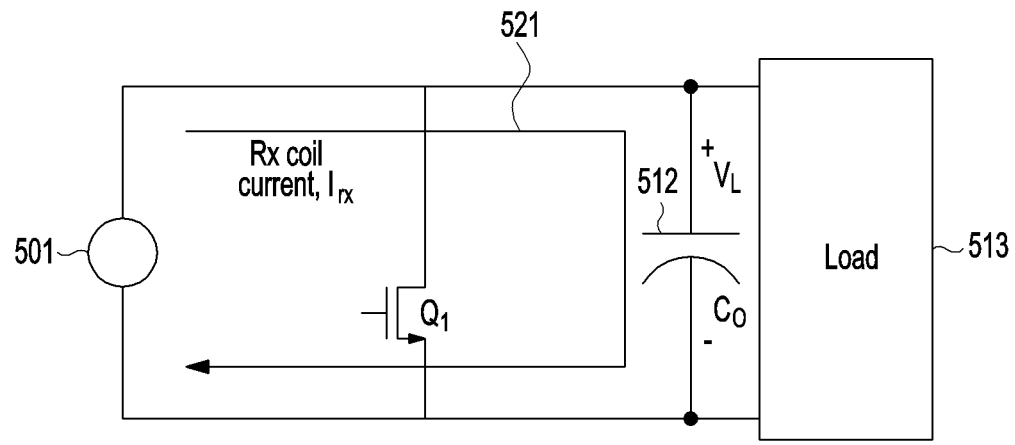
FIG. 5A is a view illustrating a current flow in a normal context in a case where an electronic device wirelessly receiving power includes a protection circuit, according to an embodiment.
Figure 5B:
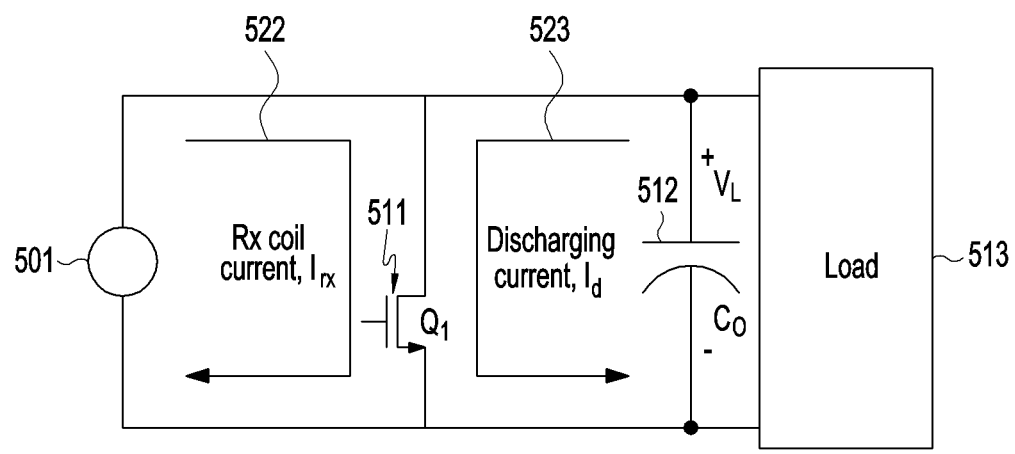
FIG. 5B is a view illustrating a current flow in an abnormal context in a case where an electronic device wirelessly receiving power includes a protection circuit, according to an embodiment.

FIG. 5A is a view illustrating a current flow in a normal context in a case where an electronic device wirelessly receiving power includes a protection circuit, according to an embodiment. FIG. 5B is a view illustrating a current flow in an abnormal context in a case where an electronic device wirelessly receiving power includes a protection circuit, according to an embodiment.

Referring to FIGS. 5A-5B, power wirelessly received is represented as equivalent to a power source 501. The power source 501 is connected to a switch (Q1) 511 and a capacitor ($C_0$) 512. The capacitor ($C_0$) 512 may be an output capacitor, and a load voltage ($V_L$) may be applied to both terminals of the capacitor 512. The load 513 is connected to the power source 501. The switch 511 may be controlled to turn on when the load voltage ($V_L$) exceeds a threshold voltage ($V_{th}$), e.g., an over voltage protection (OVP) voltage limit. When the load voltage ($V_L$) is not more than the threshold voltage ($V_{th}$), the switch 511 may be controlled to turn off.

Thus, as shown in FIG. 5A, in the normal state where the load voltage ($V_L$) is less than or equal to the threshold voltage ($V_{th}$), power from the power source 501 may be transferred to the load 513. A coil reception current ($I_{rx}$) 521 received via the coil may be transferred to the load 513. In an abnormal state where the load voltage ($V_L$) exceeds the threshold voltage ($V_{th}$), as shown in FIG. 5B, power from the power source 501 may be transferred to a detour path via the switch 511. Thus, the coil reception current ($I_{rx}$) 522 and a discharging current ($I_d$) 513 from the capacitor ($C_0$) 512 may flow through the switch 511. In some cases, the sum of the coil reception current ($I_{rx}$) 522 and the discharging current 523 may be a relatively large value, which may damage the switch 511. In particular, as the wireless power transmitter 100 may continue wireless power transmission, the coil reception current ($I_{rx}$) 522 may persist. This increases the likelihood of damaging the switch 511.

Figure 5C:
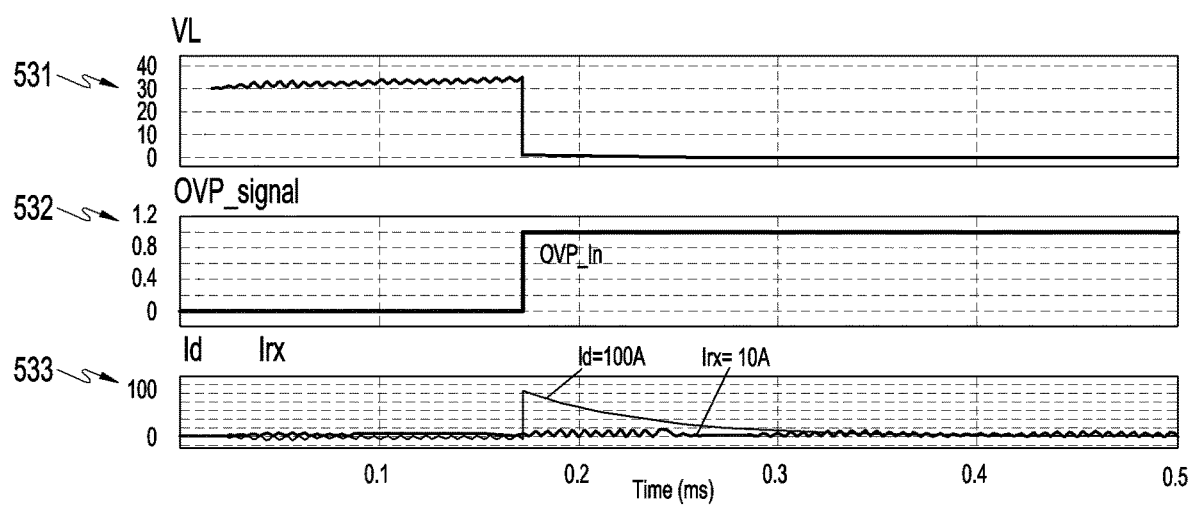
FIG. 5C is a graph illustrating a load voltage, an over-voltage signal, a coil reception current, and a discharge current using a powersim (PSIM) simulation tool, according to an embodiment.

FIG. 5C is a graph illustrating a load voltage, an over-voltage signal, a coil reception current, and a discharge current using a PSIM simulation tool, according to an embodiment.

FIG. 5C shows the result of simulation based on the over-voltage threshold voltage ($V_{th}$) being set to 5V, the capacitance ($C_0$) of the output capacitor is set to 200 micro farads (μF), and the load resistance ($R_L$) is set to 300 ohms (Ω). A look at the first graph plane 531 reveals that the load voltage ($V_L$) remains 30V and then is reduced to substantially 0V. Referring to the second graph plane 532, the over-voltage signal (OVP_signal) may be identified to occur around 0.2 milliseconds (ms). In other words, the load voltage ($V_L$) in the first graph plane 531 may be identified to reduce to substantially 0V at the time when the over voltage occurs. Referring to the third graph plane 533, the reception coil current ($I_{rx}$) may be identified to remain substantially in the order of 10 amperes (A). Further, it may be identified that the discharging current ($I_d$) occurs with the magnitude of about 100 A when the over voltage occurs and is steadily reduced. The OVP switch (e.g., the switch 511) may be broken by a large discharging current ($I_d$) and a magnitude of the reception coil current ($I_{rx}$) is steadied. When the switch is broken, there may be a good chance of damage to the hardware components in the load due to an over voltage occurring later or due to an over voltage power being steadily received.

Figure 6:
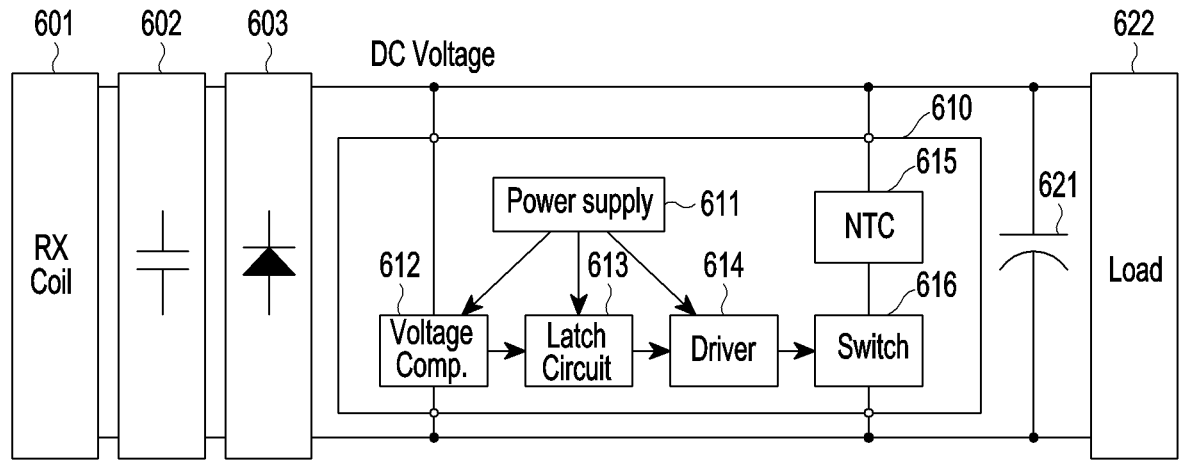
FIG. 6 is a block diagram illustrating an electronic device including a protection circuit, according to an embodiment.

FIG. 6 is a block diagram illustrating an electronic device including a protection circuit, according to an embodiment.

Referring to FIG. 6, an electronic device includes a reception (Rx) coil 601, at least one capacitor 602, a rectifier 603, an over-voltage protection circuit 610, an output capacitor 621, and a load 622.

An induced electromotive force may be produced around the reception coil 601 by an external magnetic field of which the magnitude varies over time. The reception coil 601 is not limited to a particular parameter, such as a specific magnitude, shape, or number of turns. The inductance of the reception coil 601 may be selected and prepared based on the frequency of the magnetic field produced by the wireless power transmitter but may also vary based on other factors.

At least some of the at least one capacitor 602, along with the reception coil 601, may form a resonance circuit. For example, a resonance frequency may be set according to a wireless power transmission/reception scheme. The reception coil 601 and at least some of the at least one capacitor 602 may form a resonance circuit to receive a signal set to the resonance frequency. Further, the at least one capacitor 602 may be set for impedance matching. The capacitor set for impedance matching may be separate from the at least one capacitor 602. The at least one capacitor 602 is not limited to a specific capacitance, and the connection between the at least one capacitor 602 is not limited to a specific configuration. If the electronic device receives power in an RF scheme, the electronic device may include at least one of an antenna, a phase shifter for receive-side beamforming, or a low power amplifying circuit.

The rectifier 603 may rectify received AC power (current or voltage) into DC power and output the rectified power. The rectifier 603 may be implemented as bridged diodes.

The voltage ($V_{REC}$) at the output terminal of the rectifier 603 may be a DC voltage. The over-voltage protection circuit 610 may include at least one of a power supply 611, a voltage comparator (voltage com.) 612, a latch circuit 613, a driver 614, a negative temperature coefficient thermistor (NTC) 615, or a switch 616.

The power supply 611 may provide an operation voltage to at least one of the voltage comparator 612, the latch circuit 613, or the driver 614. The power supply 611 may provide an operation voltage using power output from the rectifier 603 or power output from the battery. The power supply 611 may be implemented as a hardware component inside the over-voltage protection circuit 610 or may be disposed outside the over-voltage protection circuit 610. The power supply 611 may also mean a path from the rectifier 603 to the over-voltage protection circuit 610 or a path from the battery to the over-voltage protection circuit 610 (or a path from the PMIC to the over-voltage protection circuit 610).

The voltage comparator 612 may compare the DC voltage, i.e., the voltage ($V_{REC}$) at the output terminal of the rectifier 603, with a threshold voltage ($V_{th}$) and output the result of comparison. The threshold voltage ($V_{th}$) may be set not to exceed an over voltage prohibited from being applied to the load 622. The voltage comparator 612, when the DC voltage exceeds the threshold voltage, may output an output value (e.g., a designated first voltage). When the DC voltage is less than or equal to the threshold voltage, the voltage comparator 612 may output no value or may output a second voltage different from the designated first voltage.

When the output value (e.g., the designated first voltage) is input from the voltage comparator 612, the latch circuit 613 may maintain the output value during a designated period and output the same to the driver 614. For example, the output value from the voltage comparator 612 may not persist after occurring once. However, since the wireless power transmitter continuously provides power, the OVP operation needs to continue until the wireless power transmitter stops providing power. The latch circuit 613 may maintain the output value for the time required for the wireless power transmitter to stop providing power. The electronic device may be designed so that the operation voltage provided to the latch circuit is provided to the latch circuit 613 for a designated period. The electronic device may control the period during which the output value of the latch circuit is maintained. For example, the electronic device may maintain the output value of the latch circuit for the time required for the wireless power transmitter to stop providing power. Alternatively, the electronic device may be configured to stop maintaining the output value of the latch circuit based on the voltage applied to the reception coil 601 or the voltage applied to the output terminal of the rectifier 603 being substantially 0.

As described above, the latch circuit 613 may maintain the output value from the voltage comparator 612 during a predetermined period and output the same to the driver 614. The driver 614 may output a switch control signal (e.g., a gate voltage) for controlling the switch 616. The driver 614 may output a switch control signal for turning on the switch 616 when the output value is input from the latch circuit 613 and, if no output value is input, the driver 614 may output a switch control signal for turning off the switch 616. Here, "output the switch control signal for turning on" or "output the switch control signal for turning off" may mean the state of not outputting the designated voltage value as well as the operation of outputting the designated voltage value.

Figure 7:
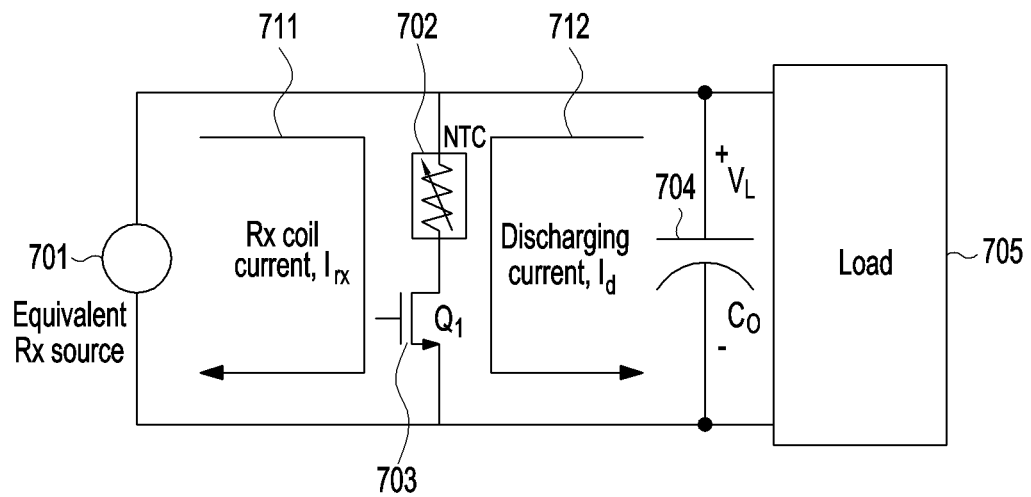
FIG. 7 is an equivalent circuit diagram corresponding to the block diagram of FIG. 6, according to an embodiment.

The NTC 615 may be implemented as an element whose resistance varies depending on the temperature. For example, the NTC 615 may include an element whose resistance decreases as the temperature increases. The NTC 615 may have a first resistance R1 at room temperature. The first resistance R1 may be relatively higher than the resistance of the load 622. When the NTC 615 has the first resistance R1, the flow of the discharging current ($I_d$) from the output capacitor 621 to the NTC 615 may be limited. For example, only a relatively small portion of the discharging current ($I_d$) may flow to the NTC 615. This is described below in greater detail with reference to FIG. 7. FIG. 7 is an equivalent circuit diagram corresponding to the block diagram of FIG. 6. The power source 701 may represent power received by the wireless power transmitter. The NTC 702 may be similar to the NTC 615 of FIG. 6. The switch 703 may be similar to the switch 616 of FIG. 6. The load 705 may be similar to the load 622 of FIG. 6. FIG. 7 may illustrate an example in which the switch 703 is controlled to turn on. FIG. 6 may illustrate an example in which the latch circuit 613 may maintain the output value. When the switch 703 is controlled to turn on, at least part of the reception current ($I_{rx}$) and at least part of the discharging current ($I_d$) from the output capacitor 704 may flow to the NTC 702. As described above, in the room temperature environment, the NTC 702 may have a relatively high resistance and, thus, application of the discharging current ($I_d$) to the NTC 702 may be limited (e.g., application of a significant portion of the discharging current ($I_d$) may be limited). The initial magnitude of the discharging current ($I_d$) may be relatively large. As application of the discharging current ($I_d$) to the NTC 702 is limited, the switch 703 may be less likely to be broken.

Meanwhile, as the reception current ($I_{rx}$) continuously flows to the NTC 702, the NTC 702 may steadily consume power, thus radiating heat. Thus, the temperature of the NTC 702 may rise, and the resistance of the NTC 702 may go down to a few tens of mΩ. As the resistance reduces, power consumption in the NTC 702 may decrease. The power consumption in the NTC 702 may be equivalent to $I_{rx}^2 R_{NTC}$; $R_{NTC}$ may be the resistance of the NTC 702. Thus, the NTC 702 may be prevented from being broken.

Referring back to FIG. 6, if the output voltage of the rectifier 603 is less than or equal to the threshold, the voltage comparator 612 may not output a value. Thus, the latch circuit 613 may also not output a value. The switch 616 may remain in the off state. In this case, the current from the rectifier 603 may be provided to the load 622.

Figure 8:
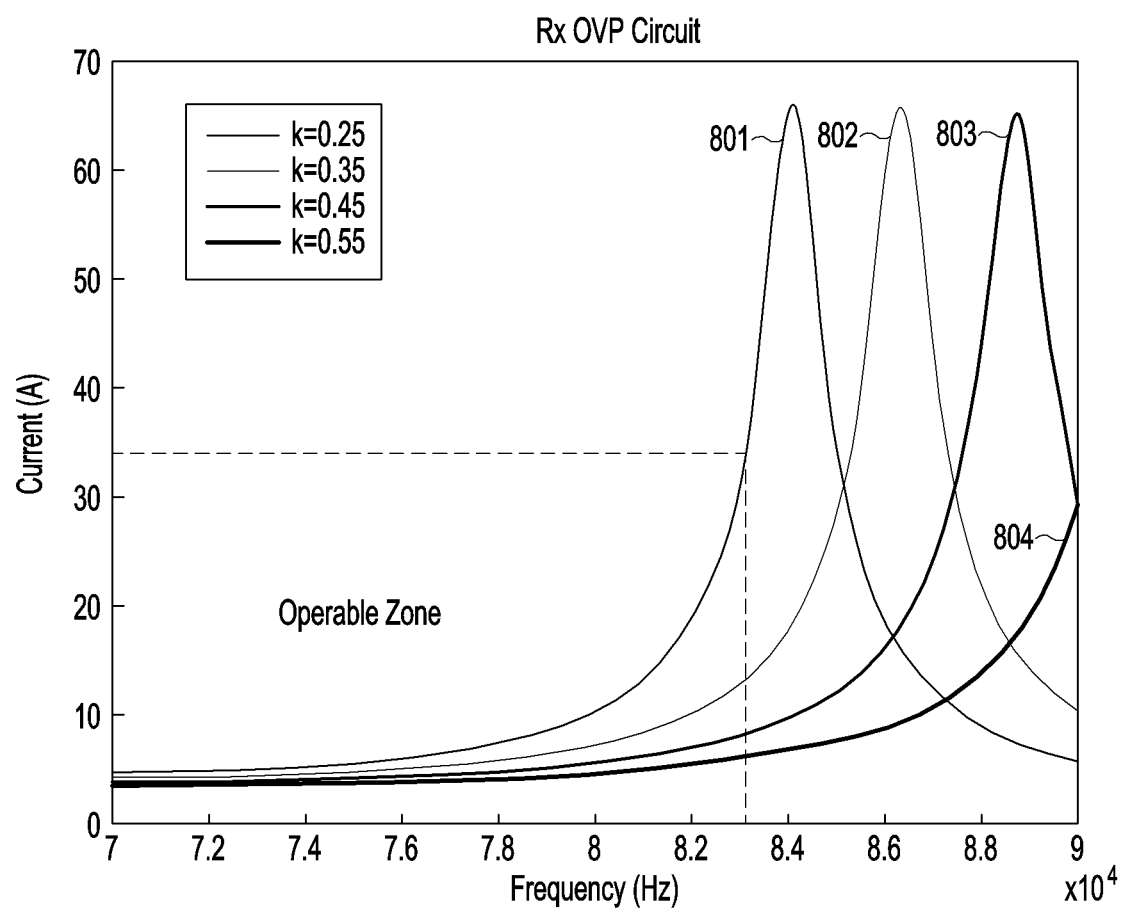
FIG. 8 is a graph illustrating the magnitude of received current per frequency, according to an embodiment.

FIG. 8 illustrates the magnitude of received current ($I_{rx}$) with respect to frequency. The correlation between the temperature and resistance of the NTC 615 or the NTC 702 may be determined based on the magnitude of current received from the wireless power transmitter. FIG. 8 illustrates graphs when a protection circuit operates, in a 100 watt (W)-class wireless power transmitter. The graphs 801, 802, 803, and 804 shown in FIG. 8 represent frequency-current relationships when the coupling coefficient k is 0.25, 0.35, 0.45, and 0.55, respectively. The resistance of the NTC 615 or the NTC 702 may be set to allow the power consumption ($I_{rx}^2 R_{NTC}$) to meet a designated condition even at the current peak. The designated condition may be a preset condition to prevent the NTC 615 or the NTC 702 from being broken and may be set, with the power consumption ($I_{rx}^2 R_{NTC}$) at the minimum resistance of the NTC 615 or the NTC 702 set as a parameter.

The OVP circuit 610 of the electronic device 150 may be configured only with the voltage comparator 612, the NTC 615, and the switch 616. The output value of the voltage comparator 612 may control the switch 616 to turn on.

The electronic device 150 may perform the above-described operations under an over current protection condition, not under the OVP condition. The electronic device 150 may include an over-current protection circuit, and the over-current protection circuit may include at least some of the components of the OVP circuit 610. Upon identifying that the over current condition is met, the electronic device 150 may be configured to control the switch 616 connected with the NTC 615 to turn on. It will readily be appreciated by the one of ordinary skill in the art that the OVP operations described herein may be varied to also be performed under the over current condition.

Figure 9:
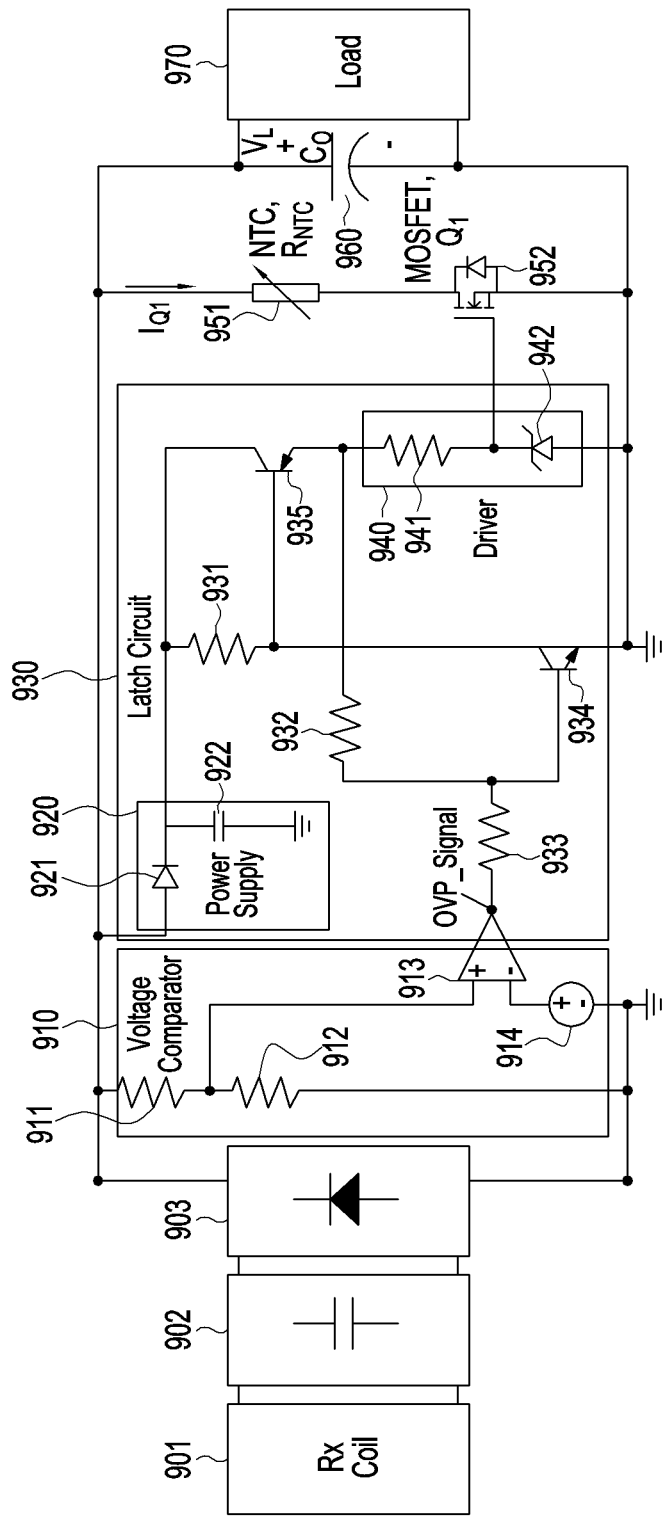
FIG. 9 is a view illustrating circuit connections in an electronic device, according to an embodiment.

FIG. 9 is a view illustrating circuit connections in an electronic device, according to an embodiment.

Referring to FIG. 9, an electronic device includes a reception coil 901, at least one capacitor 902, a rectifier 903, a voltage comparator 910, a latch circuit 940, an NTC 951, a switch 952, an output capacitor 960, and a load 970. The reception coil 901, at least one capacitor 902, the rectifier 903, and the load 970 have already been described above in connection with FIG. 6 with respect to the reception coil 601, at least one capacitor 602, the rectifier 603, and the load 622, and a repetitive description thereof is not given below.

The voltage comparator 910 includes a first resistor 911 and a second resistor 912 connected in series. An output voltage ($V_1$) of the rectifier 903 may be applied to one end of the first resistor 911. A voltage of $V_1 * R_2/(R_1+R_2)$ may be applied to a node between the first resistor 911 and the second resistor 912. $R_1$ may be the resistance of the first resistor 911, and $R_2$ may be resistance of the second resistor 912. The voltage comparator 910 may include a comparator 913. The node between the first resistor 911 and the second resistor 912 may be connected to a first input terminal of the comparator 913, so that a voltage of $V_1 * R_2/(R_1+R_2)$ may be applied to the first input terminal of the comparator 913. A voltage $V_2$ may be applied to a second input terminal of the comparator 913. Here, $V_2$ may be a value set to determine an over voltage. For example, when a voltage of $V_1 * R_2/(R_1+R_2)$ exceeds $V_2$, $V_2$ may be set to indicate that voltage $V_1$ exceeds Vth permitted for the load 970.

When the voltage of $V_1 * R_2/(R_1+R_2)$ exceeds $V_2$, the comparator 913 may output the output value (OVP_Signal) to the latch circuit 940. The elements constituting the power supply 921 and the driver 940, along with the element constituting the latch circuit 940, e.g., an element capable of maintaining the received output value (OVP_Signal) for a predetermined time, may be implemented as a single hardware component or as different hardware components.

As illustrated in FIG. 9, the latch circuit 930 includes a third resistor 931, a fourth resistor 932, a fifth resistor 933, a first bipolar junction transistor (BJT) 934, and a second BJT 935. One end of the third resistor 931 is connected to the power supply 920 and the E terminal of the second BJT 935, and the other end of the third resistor 931 is connected to the C terminal of the first BJT 934 and the B terminal of the second BJT 935. One end of the fifth resistor 933 is connected to the output terminal of the comparator 913. One end of the fourth resistor 932 and the B terminal of the first BJT 934 is connected to the other end of the fifth resistor 933. The E terminal of the first BJT 934 is grounded, and the C terminal is connected to the other end of the third resistor 931 and the B terminal of the second BJT 935. The other end of the fourth resistor 932 is connected to the C terminal of the second BJT 935 and one end of the sixth resistor 941 of the driver 940. One end of a Zener diode 942 is connected to the other end of the sixth resistor 941. The other end of the Zener diode 942 is grounded. The above-described configuration of the latch circuit 930 may be a common BJT-type latch circuit and it would readily be appreciated by one of ordinary skill in the art that the latch circuit 930 is not limited to a specific implementation example.

If the output value (OVP_Signal) is output from the comparator 913, a gate voltage may be output from the node between the sixth resistor 941 of the gate driver 940 and the Zener diode 942 to the switch 952. Further, even after the output value (OVP_Signal) is output from the comparator 913, a gate voltage may be output from the node between the sixth resistor 941 of the gate driver 940 and the Zener diode 942 to the switch 952 for a predetermined period. Further, even after the output value (OVP_Signal) is output from the comparator 913, the latch circuit 930 may output the gate voltage from the node between the sixth resistor 941 of the gate driver 940 and the Zener diode 942 to the switch 952 for a predetermined period based on power from the power supply 920.

The power supply 920 includes a diode 921 and a capacitor 922. The capacitor 922 may store electric charges from the rectifier 903 and provide an operation voltage for the latch circuit 930. The capacitance of the capacitor 922 may be selected and designed based on the period of maintaining the output value of the latch circuit 930. For example, for the wireless power transmitter to stop providing power, the electronic device needs to provide a communication signal indicating the OVP context to the wireless power transmitter, and the wireless power transmitter may recognize the OVP context from the communication signal and, thus, stop the operation of the inverter. A time required for completing all the operations may experimentally be identified, and the capacitance of the capacitor 922 may be selected to allow the capacitor 922 to transfer power to the latch circuit 930 during the required time. If the required time is identified to be two seconds, the capacitance of the capacitor 922 may be selected to be charged with electrical charges so that current may be transferred to the latch circuit 930 for two seconds.

Alternatively, the electrical charges may be supplied from the capacitor 922 to the latch circuit 930, and whether to maintain the output value of the latch circuit 930 may be controlled by the processor, which is described below in greater detail.

The gate voltage from the latch circuit 930, specifically the node between the sixth resistor 941 of the driver 940 and the Zener diode 942, may be applied to the gate terminal of the switch 952. The switch 952 may be implemented as a MOSFET, but is not limited to a specific kind or type. When the gate voltage is applied to the gate terminal, the current ($I_{Q1}$) may flow through the NTC 951. The current ($I_{Q1}$) may be the sum of at least part of the reception current ($I_{rx}$) and at least part of the discharging current ($I_d$) from the output capacitor 960.

Figure 10:
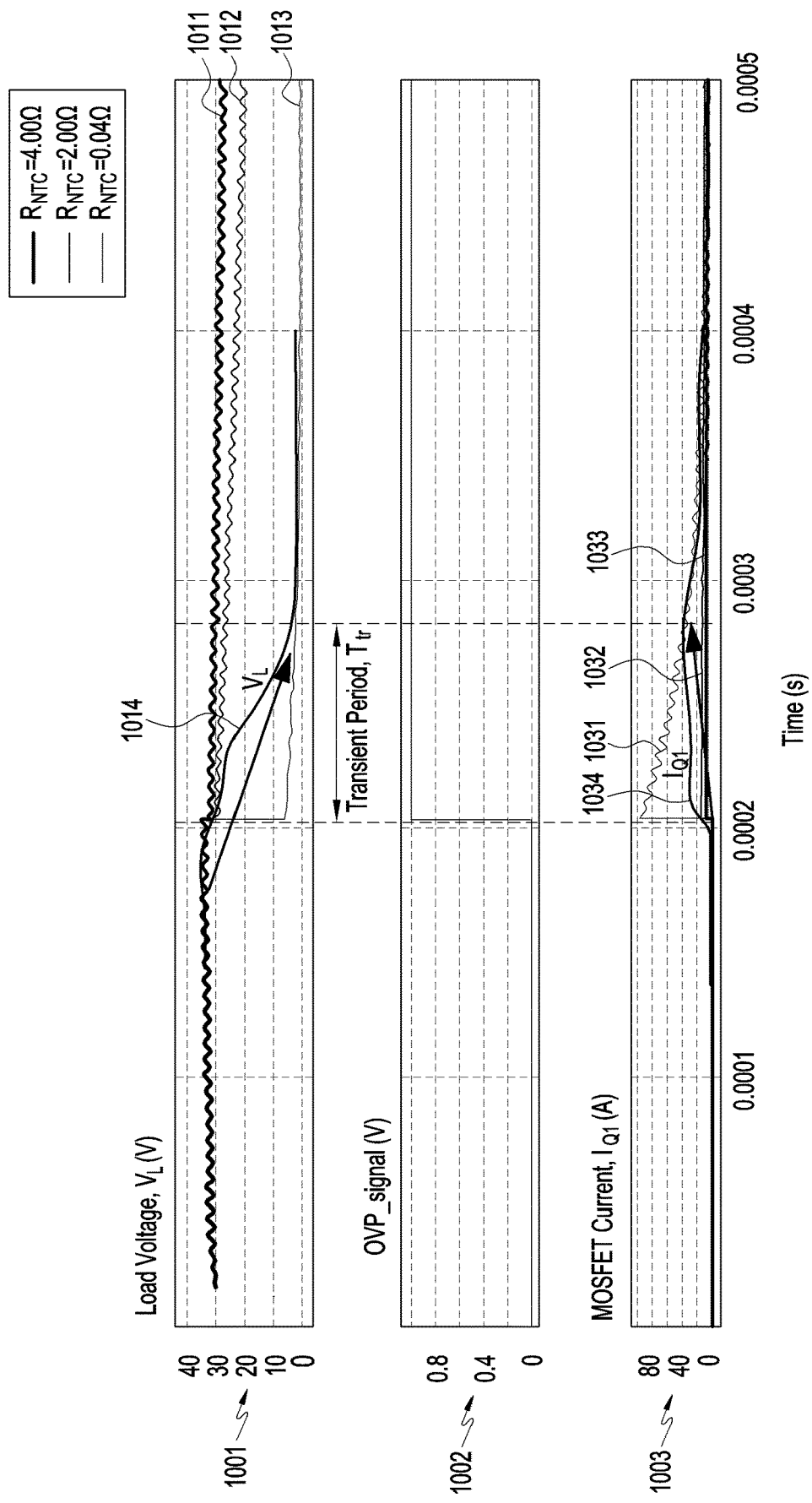
FIG. 10 is a graph illustrating a load voltage, an over-voltage signal, and a switch such as a metal-oxide-semiconductor field-effect transistor (MOSFET) current using a PSIM simulation tool, according to an embodiment.

FIG. 10 is a graph illustrating a load voltage, an overvoltage signal, and a switch (i.e., a MOSFET switch) current using a PSIM simulation tool, according to an embodiment.

FIG. 10 illustrates the result of a simulation in a state where the over voltage threshold voltage ($V_{th}$) is set to 35V, the capacitance ($C_0$) of the output capacitor is set to 200 μF, the load resistor ($R_L$) is set to 300Ω, and the NTC resistor ($R_{NTC}$) is set to vary within a range from 4Ω to 0.04Ω. In the first graph plane 1001 for the load voltage ($V_L$), a first graph 1011 when the resistance of the NTC 951 is 4Ω, a second graph 1012 when the resistance of the NTC 951 is 2Ω, and a third graph 1013 when the resistance of the NTC 951 is 0.04Ω are shown. As the temperature of the NTC 951 varies during a transient period, the resistance may alter as well. Thus, the actual load voltage ($V_L$) according to variations in the resistance of the NTC 951 is shown in a fourth graph 1014. Referring to the second graph plane 1002, the overvoltage signal (OVP_Signal) occurs from the beginning of the transient period.

In the third graph plane 1003, the switch current (MOSFET Current) ($I_{Q1}$) is shown, and also shown are a first graph 1031 when the resistance of the NTC 951 is 4Ω, a second graph 1032 when the resistance of the NTC 951 is 2Ω, and a third graph 1033 when the resistance of the NTC 951 is 0.04Ω. Thus, the switch current (MOSFET Current) ($I_{Q1}$) according to variations in the resistance of the NTC 951 is shown in a fourth graph 1034. In the fourth graph 1034, the switch current (MOSFET Current) ($I_{Q1}$) is reduced to the degree where the switch is not broken.

Figure 11:
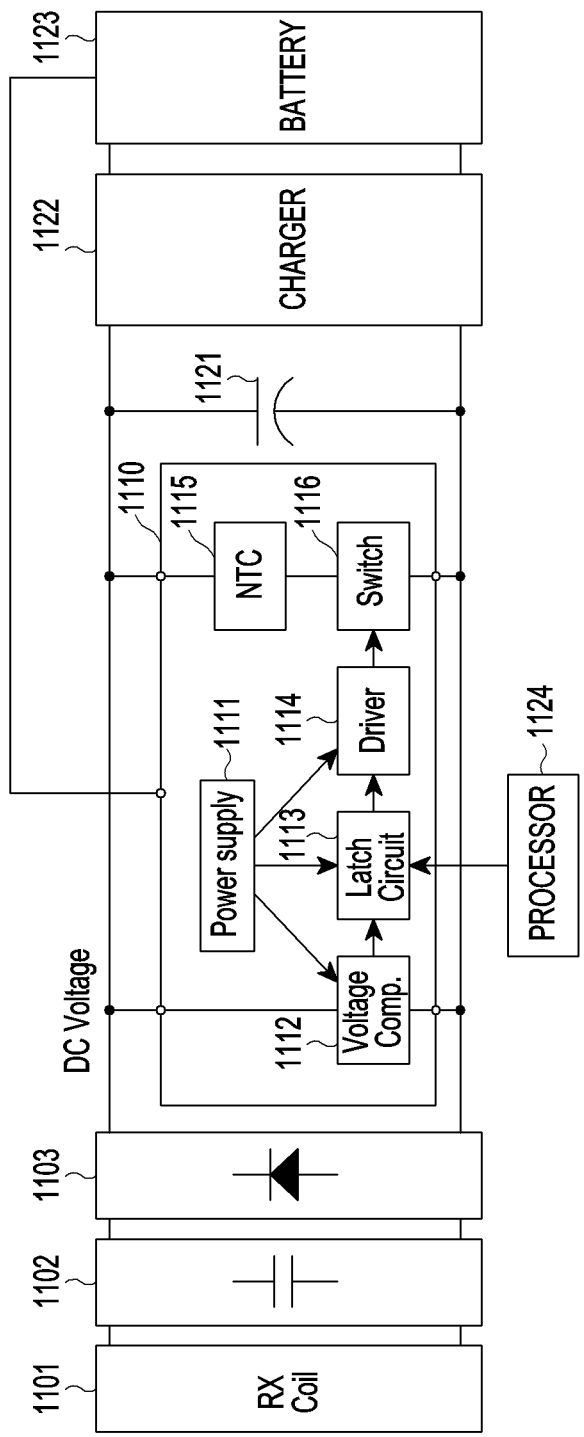
FIG. 11 is a block diagram illustrating an electronic device, according to an embodiment.

FIG. 11 is a block diagram illustrating an electronic device, according to an embodiment.

Referring to FIG. 11, an electronic device includes a reception coil 1101, at least one capacitor 1102, a rectifier 1103, an OVP circuit 1110, an output capacitor 1121, a charger 1122, a battery 1123, and a processor 1124. The OVP circuit 1110 includes a power supply 1111, a voltage comparator 1112, a latch circuit 1113, a driver 1114, an NTC 1115, and a switch 1116. A duplicate description is not given for elements which have been described above in connection with FIGS. 6 and 9.

At least one element of the OVP circuit 1110 may be operated with power provided from the battery 1123. For example, the power supply 1111 may provide power, which is received directly from the battery 1123 or via another hardware component, to the voltage comparator 1112, the latch circuit 1113, and the driver 1114. The power supply 1111 may provide power received directly/indirectly from the battery 1123 directly to at least one element of the OVP circuit 1110 or may change at least one of the voltage or current of the power and provide the resultant power to at least one element of the OVP circuit 1110.

The processor 1124 may control the latch circuit 1113 to maintain, or to not maintain, the output value from the voltage comparator 1112. The processor 1124 may control the latch circuit 1113 to maintain, or to not maintain, the output value from the voltage comparator 1112 by controlling at least some elements of the latch circuit 1113 or at least one element which provides (or transfers) power input to the latch circuit 1113. The processor 1124 may control the latch circuit 1113 or at least one element which provides (or transfers) the power input to the latch circuit 1113 to maintain the output value during a designated period (e.g., a period experimentally identified). Alternatively, the processor 1124 may control the latch circuit 1113, or at least one element which provides (or transfers) the power input to the latch circuit 1113, to maintain the output value during a designated period (e.g., a period experimentally identified) until the output voltage, i.e., the DC voltage, of the rectifier 1103 becomes substantially zero.

Figure 12:
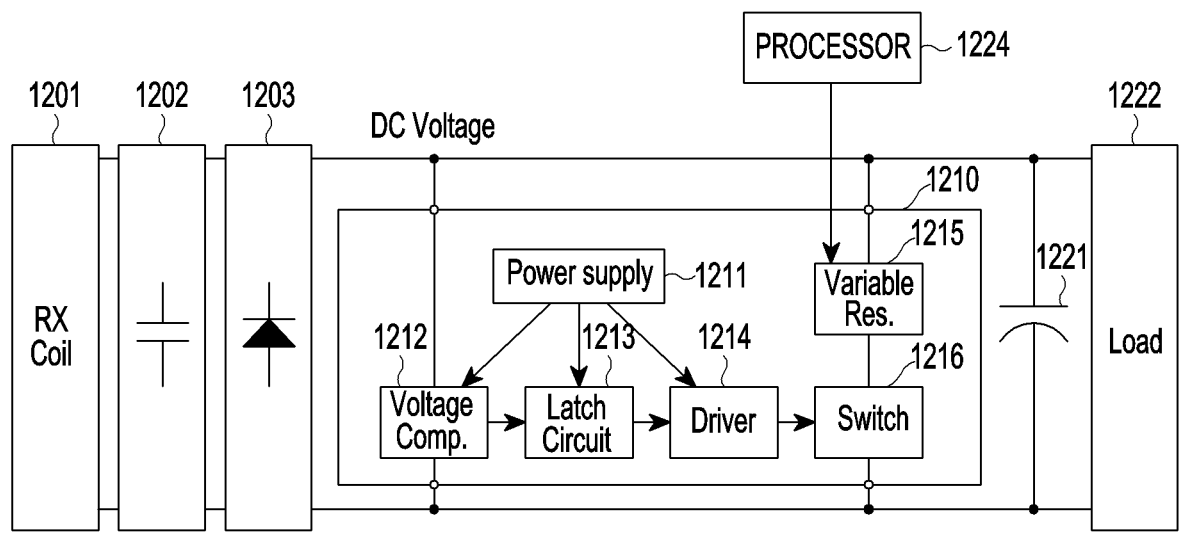
FIG. 12 is a block diagram illustrating an electronic device, according to an embodiment.

FIG. 12 is a block diagram illustrating an electronic device, according to an embodiment.

Referring to FIG. 12, an electronic device includes a reception coil 1201, at least one capacitor 1202, a rectifier 1203, an OVP circuit 1210, an output capacitor 1121, a load 1222, and a processor 1224. The OVP circuit 1210 includes a power supply 1211, a voltage comparator 1212, a latch circuit 1213, a driver 1214, a variable resistor 1215, and a switch 1216. A duplicate description is not given for the elements which have been described above in connection with FIGS. 6 and 9.

The processor 1224 may vary the resistance of the variable resistor 1215. The variable resistor 1215 may be implemented as a voltage-controlled variable resistor, the resistance of which is varied depending on voltages. The processor 1224 may adjust the resistance of the variable resistor 1215 based on the voltage at the output terminal of the rectifier 1203. As the voltage at the output terminal of the rectifier 1203 increases, the processor 1224 may reduce the resistance of the variable resistor 1215. As the resistance of the variable resistor 1215 is reduced, effects are similar to reducing the resistance in the NTC as power is consumed due to an over voltage, as previously described with respect to the NTC. The processor 1224 may identify information about the relationship between the voltage at the output terminal of the rectifier 1203 and the resistance of the variable resistor 1215, and may adjust the resistance of the variable resistor 1215 based on the identified information and the current voltage at the output terminal of the rectifier 1203.

The embodiment of FIG. 12 is substantially identical to the embodiment of FIG. 6 except that the NTC 615 is replaced with the variable resistor 1215. It would readily be appreciated by one of ordinary skill in the art that not only the embodiment of FIG. 6, but that both an embodiment in which the NTC 951 is replaced with a variable resistor in FIG. 9 and an embodiment in which the NTC 1115 is replaced with a variable resistor in FIG. 11 are possible.

Figure 13:
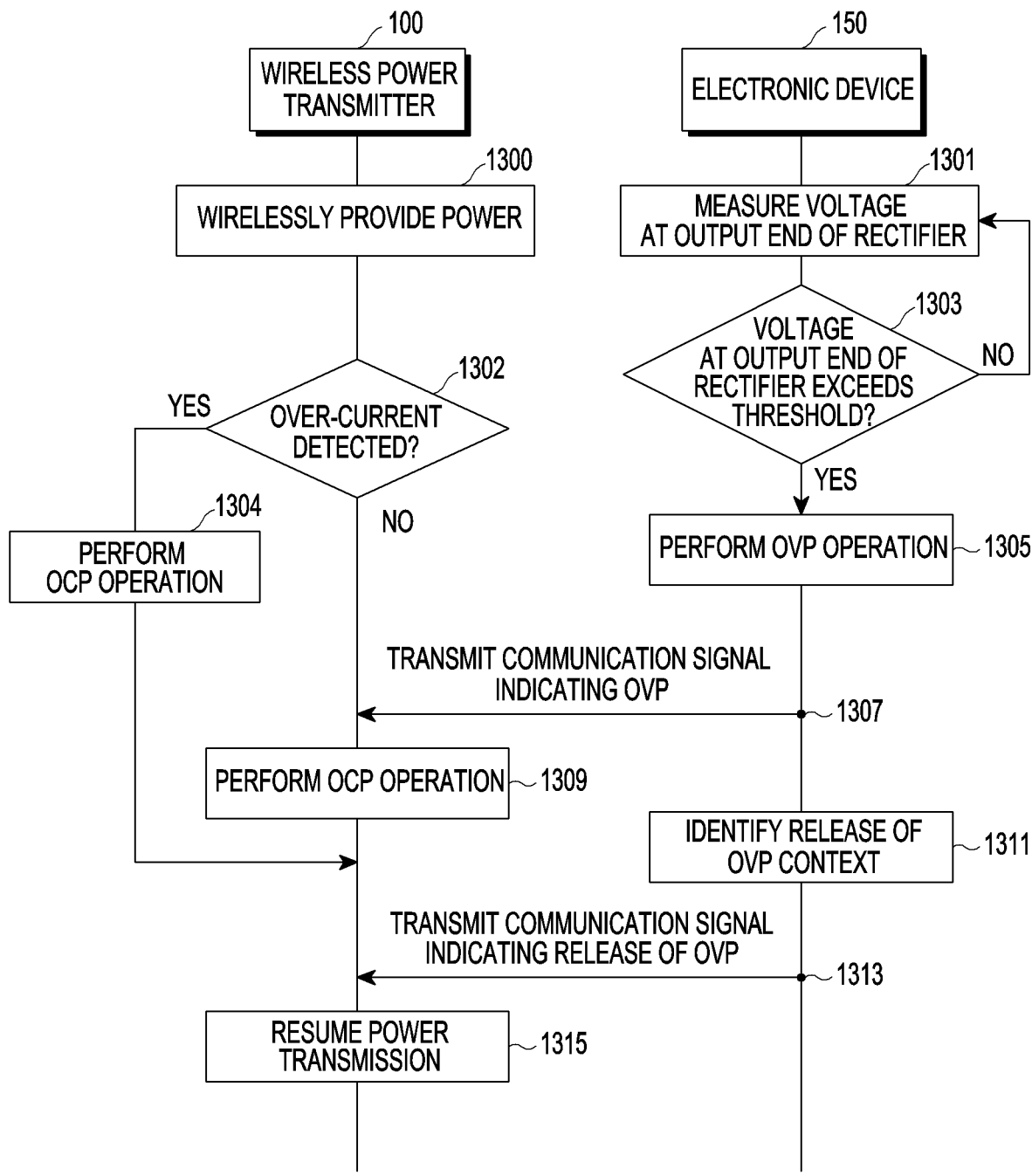
FIG. 13 is a flowchart illustrating a method of operation of a wireless power transmitter and an electronic device, according to an embodiment.

FIG. 13 is a flowchart illustrating a method of operation of a wireless power transmitter and an electronic device, according to an embodiment.

Referring to FIG. 13, the wireless power transmitter 100 wirelessly provides power in step 1300. The electronic device 150 measures the voltage at the output terminal of the rectifier in step 1301. As set forth herein, the phrase "the wireless power transmitter 100 performs a particular operation" or the phrase "the electronic device 150 performs a particular operation" may mean that at least one processor included in the wireless power transmitter 100 or the electronic device 150 performs the particular operation. The phrase "the wireless power transmitter 100 performs a particular operation" or the phrase "the electronic device 150 performs a particular operation" may mean that at least one processor included in the wireless power transmitter 100 or the electronic device 150 controls another hardware component to perform the particular operation. The phrase "the wireless power transmitter 100 performs a particular operation" or the phrase "the electronic device 150 performs a particular operation" may mean that an instruction to enable the wireless power transmitter 100 or the electronic device 150 to perform the particular operation is executed, or such instruction is stored in a storage medium.

In step 1303, the electronic device 150 identifies whether the voltage at the output terminal of the rectifier exceeds a threshold. Upon identifying that the voltage at the output terminal of the rectifier exceeds the threshold, the electronic device 150 performs an OVP operation in step 1305. For example, the electronic device 150 may control the switch connected with the NTC or variable resistor to turn on, forming a detour path connected with the NTC or variable resistor. If the variable resistor is connected with the detour path, the electronic device 150 may adjust the resistance of the variable resistor based on the voltage at the output terminal of the rectifier. The electronic device 150 may control the switch connected with the NTC or variable resistor to turn on to thereby form a detour path connected with the NTC or variable resistor even when an over current protection (OCP) condition is detected, as described above.

When the electronic device 150 forms the detour path based on the OVP operation, the impedance viewed from the wireless power transmitter 100 may be varied as well. Thus, the magnitude of the current ($I_{TX}$) input to the transmission coil of the wireless power transmitter 100 may be varied, which may result from a variation in the operation point (frequency or coupling coefficient) of the wireless power transmitter. If the current input to the transmission coil increases, the wireless power transmitter 100 may perform a designated OCP operation. For example, in step 1302, the wireless power transmitter identifies whether an over current is detected from the current input to the transmission coil. Upon identifying that an over current is detected, the wireless power transmitter 100 immediately performs an OCP operation in step 1304. For example, the wireless power transmitter 100 may identify whether an over current is detected based on whether the current input to the transmission coil exceeds a threshold current. However, in some cases, the current input to the transmission coil of the wireless power transmitter 100 may be reduced, in which case the wireless power transmitter, after receiving a report of OVP detection from the electronic device 150, may perform a designated OCP operation. In other words, upon identifying an occurrence of OCP, the wireless power transmitter 100 may immediately perform the OCP operation and, if OCP does not occur, the wireless power transmitter 100 may be configured to perform a designated operation based on a report message from the electronic device 150.

Specifically, in step 1307, the electronic device 150 transmits a communication signal indicating OVP to the wireless power transmitter 100 via the communication circuit.

The wireless power transmitter 100 performs the OCP operation in step 1309. For example, the wireless power transmitter 100 may stop the operation of forming a magnetic field via the transmission coil by stopping the inverter from operation.

In step 1311, the electronic device 150 identifies the release of OVP context. Based on detection of release of OVP context, the electronic device 150 may transmit a communication signal indicating the OVP release to the wireless power transmitter 100. The wireless power transmitter 100 resumes power transmission in step 1315.

What has been described above is intended merely for illustration purposes, and the wireless power transmitter 100 and the electronic device 150 may be operated as defined in relevant standards. For example, upon detecting an error due to OVP, the wireless power transmitter 100 may stop wireless power transmission for the electronic device 150 and return to its initial status. Thus, the wireless power transmitter 100 and the electronic device 150, after performing an error operation due to OVP, may reperform the discovery and subscription procedure defined in the standards relevant thereto.

Figure 14:
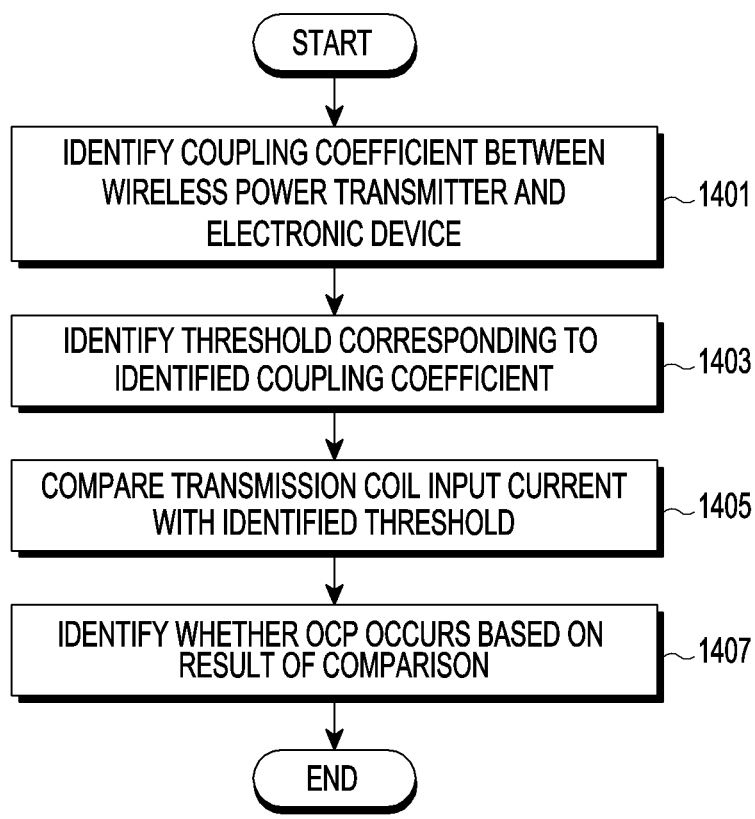
FIG. 14 is a flowchart illustrating a method of operation of a wireless power transmitter, according to an embodiment.

FIG. 14 is a flowchart illustrating a method of operation of a wireless power transmitter, according to an embodiment.

Referring to FIG. 14, the wireless power transmitter identifies a coupling coefficient between the wireless power transmitter and the electronic device in step 1401. The wireless power transmitter may receive reception power-related information (e.g., the voltage of the reception coil of the electronic device or the voltage at the output terminal of the rectifier) from the electronic device. The wireless power transmitter may identify the coupling coefficient based on the magnitude of power received from the electronic device and the magnitude of transmission power. It will readily be appreciated by one of ordinary skill in the art that identifying the coupling coefficient is not limited to a specific scheme.

In step 1403, the wireless power transmitter identifies the threshold corresponding to the identified coupling coefficient. In step 1405, the wireless power transmitter compares the transmission coil input current with the identified threshold. In step 1407, the wireless power transmitter identifies whether OCP occurs based on the result of comparison. For example, upon identifying that the transmission coil input current is larger than the threshold, the wireless power transmitter may identify that OCP occurs and may perform an operation responsive to the OCP. If the transmission coil input current is less than or equal to the threshold, the wireless power transmitter may identify that no OCP has occurred. Thereafter, the wireless power transmitter, upon receiving an OVP detection signal, may perform an operation (e.g., turning off the inverter) responsive to OCP.

Figure 15:
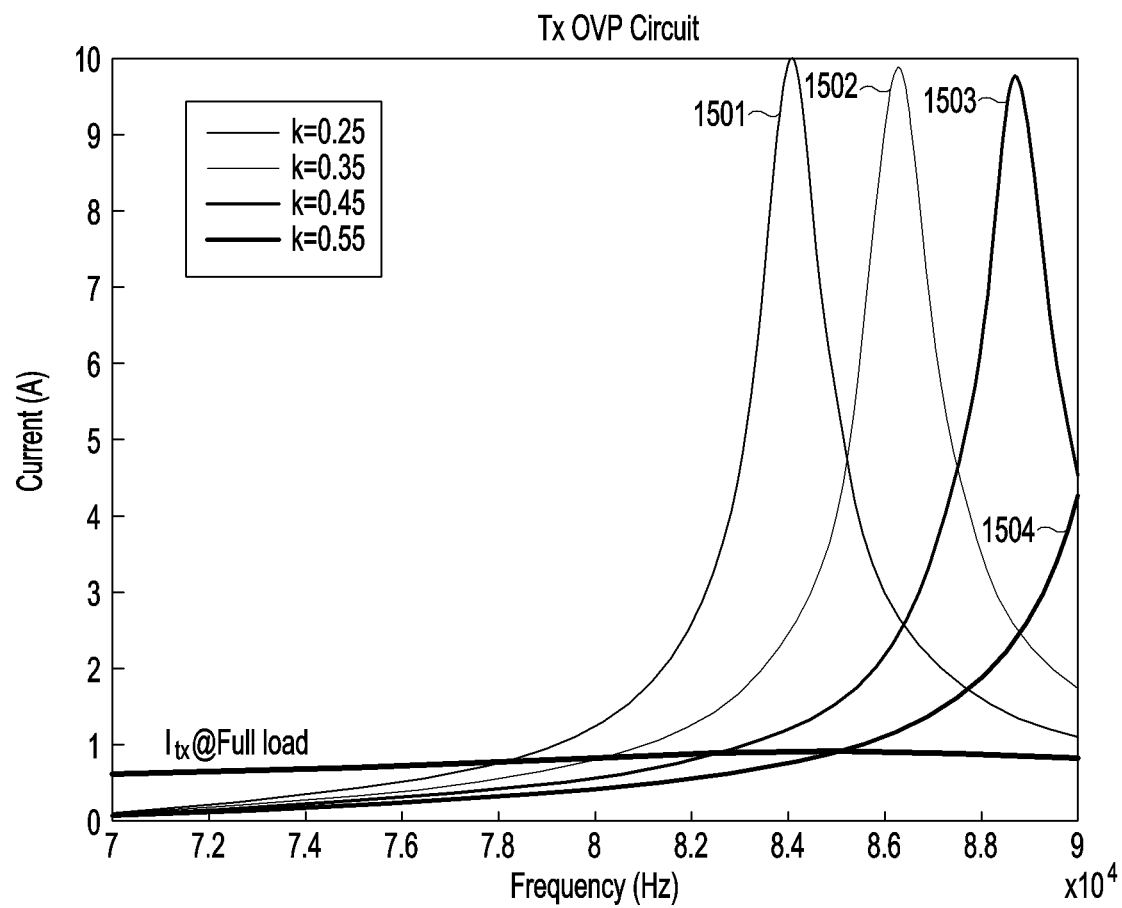
FIG. 15 is a view illustrating the respective graphs of a plurality of coupling coefficients in a wireless power transmitter when a short circuit occurs in an electronic device, according to an embodiment.

FIG. 15 is a view illustrating the respective graphs of a plurality of coupling coefficients in a wireless power transmitter when a short circuit occurs in an electronic device, according to an embodiment.

Referring to FIG. 15, a first graph 1501 denotes a per-frequency input current when the coupling coefficient is 0.25, a second graph 1502 denotes a per-frequency input current when the coupling coefficient is 0.35, a third graph 1503 denotes a per-frequency input current when the coupling coefficient is 0.45, and a fourth graph 1504 is a per-frequency input current when the coupling coefficient is 0.55. As shown in FIG. 15, the input current may differ per coupling coefficient and, thus, the threshold for determining OCP may be set to differ per coupling coefficient.

The electronic device according to various embodiments may include, for example, a portable communication device (e.g., a smart phone), a computer device, a portable multimedia device, a portable medical device, a camera, a wearable device, or a home appliance. The electronic devices are not limited to the embodiments described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, there may be an electronic device that includes a variable resistor connected to the path of a switch for discharging when an abnormality occurs. Thus, a relatively low current may be discharged via the switch when an abnormality occurs, thereby allowing the protection circuit to properly function.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
   a reception coil configured to wirelessly receive power based on an externally formed magnetic field;
   a rectifier configured to rectify power generated from the reception coil;
   an over-voltage protection circuit connected with the rectifier; and
   an output capacitor connected with the over-voltage protection circuit,
   wherein the over-voltage protection circuit includes:
   a negative temperature coefficient thermistor (NTC) selectively connected in parallel with the rectifier and the output capacitor, and
   a switch connecting the NTC to the rectifier and the output capacitor in case that a voltage at a rectifier output terminal exceeds a threshold voltage, and disconnecting the NTC from the rectifier and the output capacitor in case that the voltage at the rectifier output terminal is less than or equal to the threshold voltage,
   wherein the NTC has a resistance value based on a power consumption of the NTC associated with a magnitude of a current flowing through the NTC in case that the voltage at the rectifier output terminal exceeds the threshold voltage.

2. The electronic device of claim 1, wherein the over-voltage protection circuit further includes:
   a voltage comparator including a first input terminal connected with the rectifier output terminal and a second input terminal to which the threshold voltage is input, and a comparator output terminal,
   wherein the voltage comparator is configured to output a comparator output value via the comparator output terminal in case that the voltage at the rectifier output terminal exceeds the threshold voltage and to stop outputting the comparator output value via the comparator output terminal in case that the voltage at the rectifier output terminal is less than or equal to the threshold voltage.

3. The electronic device of claim 2, wherein the over-voltage protection circuit further includes:

a latch circuit connected with the comparator output terminal, wherein the latch circuit is configured to keep outputting a latch output value via a latch output terminal during a first period in case that the comparator output value is input from the voltage comparator, and wherein the switch is controlled to turn on or off based on the latch output value.

4. The electronic device of claim 3, wherein the over-voltage protection circuit further includes:

a driver configured to output a switch control signal for controlling e switch to turn on while receiving the latch output value to the switch, wherein the switch is configured to connect the NTC to the rectifier and the output capacitor upon receiving the switch control signal from the driver.

5. The electronic device of claim 3, wherein the latch circuit is further configured to keep outputting the latch output value during the first period based on at least some of the rectified power.

6. The electronic device of claim 5, further comprising:
a diode connected with the rectifier output terminal; and
a capacitor connected with the diode, wherein the capacitor is configured to store at least some of the rectified power via the diode, and wherein the at least some of the rectified power stored in the capacitor is configured to be provided to the latch circuit.

7. The electronic device of claim 6, wherein a capacitance of the capacitor is selected to allow the capacitor to have a quantity of electrical charge for the latch circuit to keep outputting the latch output value during the first period.

8. The electronic device of claim 3, further comprising:
a battery configured to be charged with the rectified power, and a processor configured to control the latch circuit to keep outputting the latch output value during the first period, wherein the latch circuit is configured to receive at least some power from the battery and keep outputting the latch output value during the first period based on at least some of the received power.

9. The electronic device of claim 1, further comprising:
a communication circuit configured to transmit a communication signal indicating over-voltage protection to the wireless power transmitter to stop the externally formed magnetic field in case that, the voltage at the output terminal of the rectifier exceeds the threshold.

10. An electronic device, comprising:
a reception coil configured to generate an induced electromotive force based on an externally formed magnetic field;
a rectifier configured to rectify power generated from the reception coil;
an over-voltage protection circuit connected with the rectifier;
an output capacitor connected with the over-voltage protection circuit; and
a processor,
wherein the over-voltage protection circuit includes:
a variable resistor selectively connected in parallel with the rectifier and the output capacitor,
a voltage comparator including a first input terminal connected with a rectifier output terminal and a second input terminal to which a threshold voltage is input, and a comparator output terminal, wherein the voltage comparator is configured to output a comparator output value via the comparator output terminal in case that a voltage at the rectifier output terminal exceeds the threshold voltage, and to stop outputting the comparator output value via the comparator output terminal in case that the voltage at the rectifier output terminal is less than or equal to the threshold voltage, a latch circuit connected with the comparator output terminal, wherein the latch circuit is configured to keep outputting a latch output value via a latch output terminal during a first period in case that the comparator output value is input from the voltage comparator, and a switch configured to be controlled to turn on or off based on the latch output value, connect the variable resistor to the rectifier and the output capacitor in case that the voltage at the rectifier output terminal exceeds the threshold voltage, and disconnect the variable resistor from the rectifier and the output capacitor in case that the voltage at the rectifier output terminal is less than or equal to the threshold voltage, and wherein the processor is configured to adjust a resistance of the variable resistor based on the voltage at the rectifier output terminal.

11. The electronic device of claim 10, wherein the over-voltage protection circuit further includes:

a driver configured to output a switch control signal for controlling e switch to turn on while receiving the latch output value to the switch, wherein the switch is configured to connect the variable resistor to the rectifier and the output capacitor upon receiving the switch control signal from the driver, wherein the latch circuit is further configured to keep outputting the latch output value during the first period based on at least some of the rectified power.

12. The electronic device of claim 11, further comprising:
a diode connected with the rectifier, output terminal; and
a capacitor connected with the diode, wherein the capacitor is configured to store at least some of the rectified power via the diode, wherein the at least some of the rectified power stored in the capacitor is configured to be provided to the latch circuit.

13. The electronic device of claim 12, wherein a capacitance of the capacitor is selected to allow the capacitor to have a quantity of electrical charge for the latch circuit to keep outputting the latch output value during the first period.

14. The electronic device of claim 10, further comprising:
a battery configured to he charged with the rectified power, wherein the latch circuit is configured to receive at least some power stored in the battery, and keep outputting the latch output value during the first period based on at least part of the received power, and wherein the processor is further configured to control the latch circuit to keep on outputting the latch output value during the first period.

15. The electronic device of claim 10, further comprising:
a communication circuit configured to transmit a communication signal indicating over-voltage protection to the wireless power transmitter to stop the externally formed magnetic field in case that the voltage at the rectifier output terminal exceeds the threshold voltage.

16. The electronic device of claim 10, wherein the processor is further configured to reduce the resistance of the variable resistor as the voltage at the rectifier output terminal increases.

* * * * *